(12) United States Patent
Jones et al.

(10) Patent No.: US 11,487,785 B2
(45) Date of Patent: Nov. 1, 2022

(54) MONITORING DATABASE AGENTS RUNNING ON SERVERS CONNECTED BY A COMPUTER NETWORK

(71) Applicant: salesforce.com, inc., San Francisco, CA (US)

(72) Inventors: Matthew William Jones, Carmel, IN (US); Tatiana Seltsova, Gold Coast (AU)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/344,513

(22) Filed: Jun. 10, 2021

(65) Prior Publication Data

US 2022/0012263 A1 Jan. 13, 2022

Related U.S. Application Data

(60) Provisional application No. 63/048,958, filed on Jul. 7, 2020.

(51) Int. Cl.
*G06F 16/27* (2019.01)
*G06F 16/23* (2019.01)
*G06F 16/21* (2019.01)

(52) U.S. Cl.
CPC .............. *G06F 16/27* (2019.01); *G06F 16/21* (2019.01); *G06F 16/235* (2019.01); *G06F 16/2358* (2019.01)

(58) Field of Classification Search
CPC ..... G06F 16/21; G06F 16/235; G06F 16/2358
USPC ........................................................ 707/609
See application file for complete search history.

(56) References Cited

U.S. PATENT DOCUMENTS

2004/0078461 A1\* 4/2004 Bendich .............. G06F 11/3495
709/224

\* cited by examiner

*Primary Examiner* — Michael Pham
(74) *Attorney, Agent, or Firm* — Fenwick & West LLP

(57) ABSTRACT

A system monitors database agents associated with DBMSs running on servers, for example, servers of an organization connected by a network. The system determines whether each database agent is running according to a schedule and whether the database agent is running the correct version of a script. The system may generate a report describing differences between database agents that are running on database instances and a master configuration of database agents representing the expected configuration of the database agent. If a database instance is executing a configuration of a database agent that is different from the master configuration of the database agent, the system updates the database agent executing on the database instance to ensure that the configuration matches the master configuration.

20 Claims, 6 Drawing Sheets

MONITORING DATABASE AGENTS RUNNING ON SERVERS CONNECTED BY A COMPUTER NETWORK

CROSS-REFERENCE TO RELATED APPLICATIONS

This application claims the benefit of U.S. Provisional Application No. 63/048,958 filed Jul. 7, 2020, which is incorporated by reference herein.

FIELD OF ART

This disclosure relates in general to monitoring of database management systems (DBMSs) connected via a network, and in particular to monitoring database agents associated with DBMSs running on servers connected via a computer network.

BACKGROUND

Large organizations use multiple instances of database management systems for managing data for the organization. These database management systems run on computing systems connected via a network. Systems such as multi-tenant systems serve several organizations and therefore run a large number of DBMSs. Furthermore, each organization may run multiple database agents on these DBMSs. A database agent may run a script with database commands or other processes. A large system may include several hundred instances of databases, each running hundreds or thousands of jobs at different schedules. Some of these jobs may run at different schedules than expected due to human errors or other factors. Due to the complexity of such large systems, monitoring and tracking these database agents is difficult. Conventional techniques for monitoring these database agents by manual inspection are cumbersome and error prone.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments of the invention comprise a database agent monitoring system that monitors database agents associated with DBMSs running on servers, for example, servers of an organization connected by a network. The database agent monitoring system determines whether each database agent is running according to a schedule and whether the database agent is running the correct version of a script. The system maintains a master version of configurations for database agents. The system generates a report identifying database agents that are running versions of database agents different from the master version for the corresponding database agent. The system may further update the database agents that are running a different version from the master configuration so that the configuration of an updated database agent matches the master configuration.

System Environment

Figure 1:
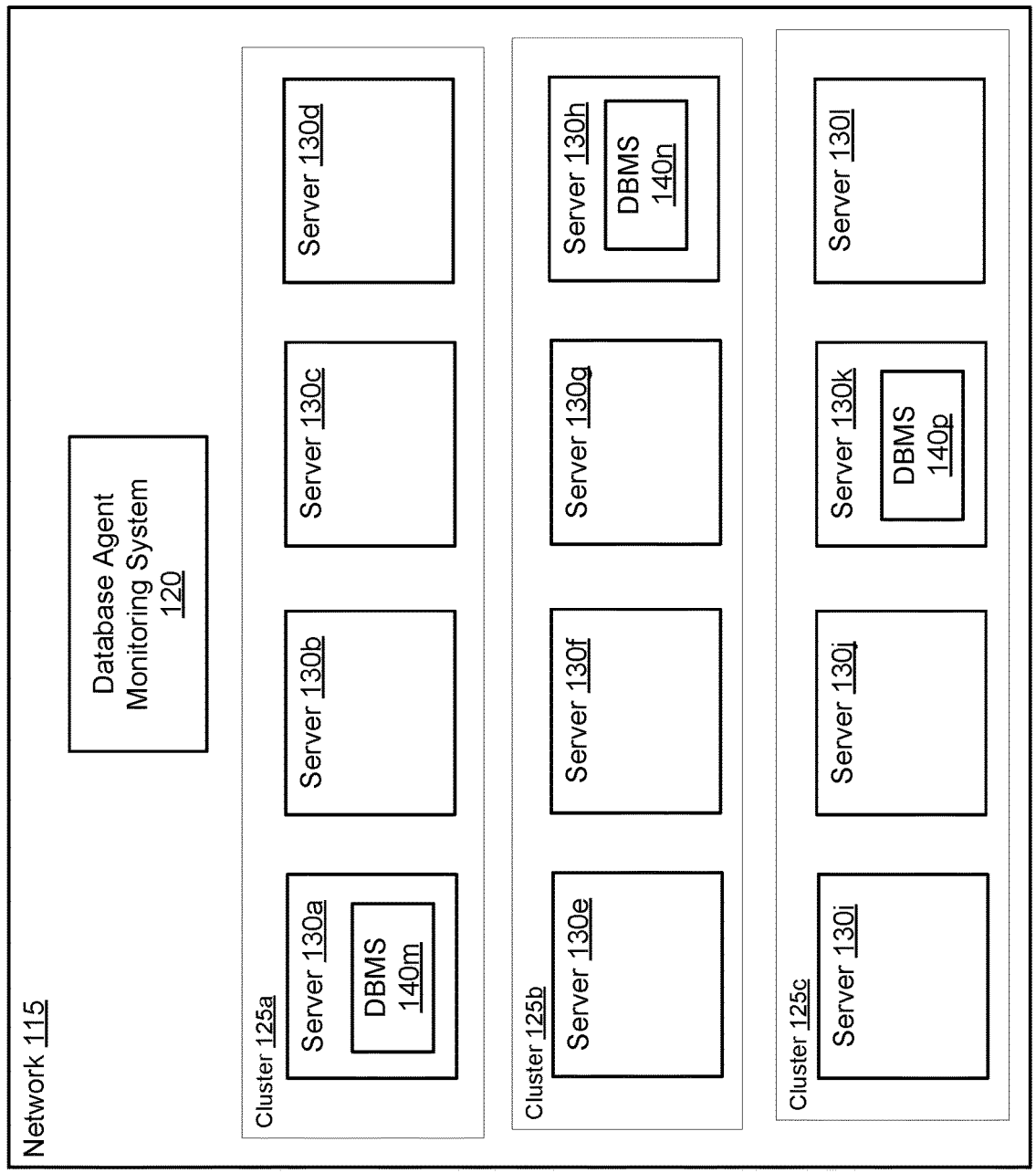
FIG. 1 is a block diagram of a system environment for monitoring database agents running on a set of servers, according to one embodiment.

FIG. 1 is a block diagram of a system environment for monitoring database agents running on a set of servers, according to one embodiment. The system environment 100 shows several computers of an organization that may interact using a network of the organization. The system environment shows a network 115 of the organization that allows interactions between a database agent monitoring system 120 and multiple servers 130. The system environment 100 may include other systems or components not shown in FIG. 1, for example, various types of data stores, client devices for interacting with servers, and so on.

Different database agents may run on different schedules. A job may run a script, for example, a stored procedure comprising a set of database commands that may be invoked remotely, using a program, or via command line. For example, certain database agents may be scheduled to run every few minutes, some database agents may be scheduled to run every day at a prespecified time, some database agents may be scheduled to run weekly or on certain days of the week and so on. Furthermore, each script may have different versions created as a result of modifications made to the script. For example, different versions of the script may use different parameters for the commands within the script, different commands within the script, and so on. A specific version of the script maybe specified for running a particular database agent.

Different teams and team members may add, delete, or modify these database agents associated with DBMS on a regular basis. Over time there are changes in the database agents running across the distributed system. For example, members of a team may make changes to the schedule of a database agent or the configurations of a database agent. The change may be a temporary change that is implemented for a specific purpose, for example, to test a feature. However, the modified version may continue to run instead of the original version. As a result of these changes, the schedules and configurations of the database agents running on the distributed system may drift over time. The number of database agents can be large, for example, several hundreds of thousands of database agents running across a large distributed system, such as multi-tenant system.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

The database agent monitoring system 120 monitors the database agents running on the servers connected via the network 115. The database agent monitoring system 120 executes the processes disclosed herein. A database agent may also be referred to herein as a job or a database job. In an embodiment, the DBMSs are SQL servers and the database agents are SQL agents running on SQL Server instances. Examples of tasks performed using such jobs or agents include reclaiming storage space, performing backup, updating table statistics, checking error logs, performing various maintenance tasks, logging specific information such as audit information, check log size and send an alert if the log size exceeds a threshold, check database size and perform an action if the size meets certain threshold, recycle error logs, and so on.

The servers 130 may be organized as clusters 125. As shown in FIG. 1, each cluster includes multiple servers 130, for example, four servers 130 per cluster 125. For example, cluster 125*a* has servers 130*a*, 130*b*, 130*c*, and 130*d*, cluster 125*b* has servers 130*e*, 130*f*, 130*g*, and 130*h*, and cluster 125*c* has servers 130*i*, 130*j*, 130*k*, and 130*l*. In an embodiment, a DMBS is assigned to a cluster. The DBMS may run on any one of the servers of the cluster 125. For example, the DBMS 140*m* runs on server 130*a* of cluster 125*a*, the DBMS 140*n* runs on server 130*h* of cluster 125*b*, the DBMS 140*p* runs on server 130*k* of cluster 125*c*, and so on. In some embodiments, a server may be a powerful machine with a large number of cores and may be included in multiple clusters. Accordingly, multiple DBMSs may run on the same server.

Although the system environment 100 is illustrated using a particular configuration of database management systems, servers, and network, the techniques disclosed herein apply to other configurations as well, for example, in a system environment that does not allow relocation of database management system instances due to failover.

In some embodiment, the servers 130 implement a multi-tenant system. A multi-tenant system stores data of one or more tenants. Each tenant may be an enterprise or an organization that represents a customer of the multi-tenant system. Each tenant may have multiple users that interact with the multi-tenant system via client devices. Various elements of hardware and software of the multi-tenant system may be shared by multiple tenants.

In one embodiment, a multi-tenant system implements a web-based customer relationship management (CRM) system. For example, the multi-tenant system may store applications configured to implement and execute CRM software applications. As an example, one tenant might be a company that employs salespersons that use client devices to manage their sales process. Thus, a user might maintain contact data, leads data, customer follow-up data, performance data, goals and progress data, etc., all applicable to that user's personal sales process.

A multi-tenant system includes a data store that stores data for various tenants of the multi-tenant system. It is transparent to tenants that their data may be stored in a data store that is shared with data of other tenants. The data store may store data for different tenants in separate physical structures, for example, separate database tables or separate databases. Alternatively, the data store may store data of multiple tenants in a shared structure. For example, user accounts for all tenants may share the same database table. However, the multi-tenant system stores additional information to logically separate data of different tenants. Accordingly, data of one tenant is kept logically separate from that of other tenants so that one tenant does not have access to another tenant's data, unless such data is expressly shared.

Since a multi-tenant system may store information for several enterprises or organizations, the multi-tenant system needs a large number of servers running a large number of DBMSs. Each DBMS may be shared across multiple tenants. Accordingly, a multi-tenant system needs to implement policies to relocate DBMSs in case of failover to ensure that the DBMSs have very small downtime.

The servers 130 shown in FIG. 1 represent computing systems. A computing system can be a conventional computer system executing, for example, a Microsoft™ Windows™-compatible operating system (OS), Apple™ OS X, and/or a Linux OS. A computing system such as a client device can be a laptop, desktop, or any device with a display monitor for displaying a user interface.

In various embodiments, the network 115 uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
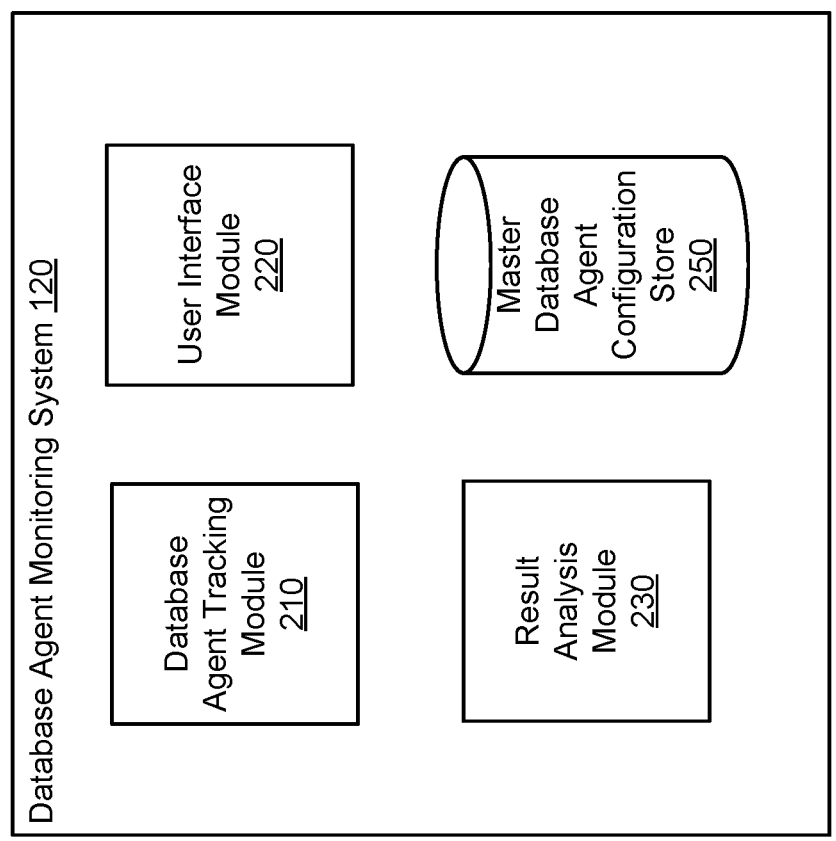
FIG. 2 is a block diagram illustrating architecture of a database agent monitoring system, according to one embodiment.

FIG. 2 is a block diagram illustrating architecture of a database agent monitoring system, according to one embodiment. The database agent monitoring system includes a database agent tracking module 210, a user interface module 220, a result analysis module 230, and a master database agent configuration store 250. Other embodiments can have different and/or other components than the ones described here. Furthermore, the functionalities described herein can be distributed among the components in a different manner.

The database agent tracking module 210 interacts with various servers to identify all the database agents running on the servers and receives information describing the database agents. In particular, the database agent tracking module 210 receives information describing the schedule of the database agent and the configuration of the database agent.

The database agent tracking module 210 builds a data structure representing a collective master database agent configuration and stores it in the master database agent configuration store 250. The master database agent configuration store 250 may also be referred to as an inventory database. The master database agent configuration store 250 stores attributes of jobs including a job name, job version, a field indicating whether the job is customized for a database instance or for a tenant, and so on. In an embodiment, the master database agent configuration store 250 is a relational database that stores one or more tables storing information describing various jobs.

In an embodiment, the database agent tracking module 210 uses JSON (JavaScript Object Notation) format for representing the data structure storing the master database agent configuration. Following is an example of a data structure representing the master database agent configuration based on JSON notation. The data structure specifies various attributes of a particular job such as a job type, a job name, a description, a category name, and so on. In an embodiment, the data structure representing the job is extracted from data stored in a metadata table describing the jobs. For example, an attribute of the JSON structure may be extracted from one or more columns of the metadata table. The data structure specifies an array representing steps of the job, each step representing an operation performed by the job. The data structure includes attributes of each step such as step identifier, step name, the next step to execute if the current step fails, the next step to execute if the current step successfully completes execution, a database name, number of retries of the step in case of failure, retry interval, and so on. The instructions for each step may be stored separately in a repository. The data structure further includes an array representing the schedule for the job. The instructions for each step may be represented as a script that executes one or more data base commands or stored procedures. The instructions for a job may be stored as a binary executable file. The schedule specifies the frequency with which the job is executed, and the start dates and times for the job to execute. In an embodiment, the system creates a job creation script and a job update script by combining or invoking the individual scripts of the steps. The job creation script is executed by a database instance to start or execute the job and the job update script is executed by the database instance to update an existing job that is running. In an embodiment, the system creates instructions for configuring a user interface, for example, a form for allowing a user to specify certain parameters for the job. The execution of the instructions causes the user interface to be configured and displayed, thereby receiving the required user inputs used to start the job.

In an embodiment, the description field includes a job version identifier. In some embodiments the job version is included as a separate attribute. The job version identifier may further specify if the job has been customized for that specific database instance. For example, a tenant of a multi-tenant system may customize the job such that the job for that tenant is different from the default job that may be executed for most tenants. The data structure may use the description table for encoding the version if the underlying metadata table does not include a separate column for storing the version of the job.

```
{
    "job_type": "ET Job",
    "job_name": "dbMaintTableSizes",
    "Enabled": 1,
    "Description": "[Job Version V1] Daily capture of all table sizes.
    "Owned By: Team T1",
    "start_step_id": 1,
    "Category_name": "DB Maintenance",
    "Delete_level": 0,
    "steps": [
        {
            "step_id": 1,
            "Step_name": "Capture table sizes",
            "Subsystem": "TSQL",
            "on_success_step_id": 2,
            "on_fail_step_id": 3,
            "on_fail_action": 4,
            "database_name": "WorkTableDB",
            "retry_attempts": 0,
            "retry_interval": 0
        },
        {
            "step_id": 2,
            "Step_name": "OnSuccess",
            "Subsystem": "TSQL",
            "on_success_step_id": 0,
            "on_fail_step_id": 3,
            "on_fail_action": 4,
            "database_name": "Utility",
            "retry_attempts": 0,
            "retry_interval": 0
        },
        {
            "step_id": 3,
            "Step_name": "OnFailure",
            "Subsystem": "TSQL",
            "on_success_step_id": 0,
            "on_fail_step_id": 0,
            "on_fail_action": 2,
            "database_name": "Utility",
            "retry_attempts": 0,
            "retry_interval": 0
        }
```

-continued

```
    ],
    "schedules": [
        {
            "schedule_id": 3020,
            "name": "dbMaintTableSizes_Schedule",
            "enabled": 1,
            "freq_type": 4,
            "freq_interval": 1,
            "freq_subday_type": 1,
            "freq_subday_interval": 0,
            "freq_relative_interval": 0,
            "freq_recurrence_factor": 0,
            "active_start_date": 20100812,
            "active_end_date": 99991231,
            "active_start_time": 100,
            "active_end_time": 235959
        }
    ]
}
```

The database agent tracking module 210 periodically interacts with the database agents to receive the latest schedule and configuration information for comparing with the collective master database agent configuration data structure.

In an embodiment, each database instance running in the system connects with the master database agent configuration store 250 periodically and accesses the information describing the jobs. The database instance further extracts the information from the actual jobs running on the database instance. The database instance compares the information describing each job extracted from the master database agent configuration store 250 with the corresponding information extracted from the actual job that is running on that database instance. If there are differences in the information describing each job extracted from the master database agent configuration store 250 and the corresponding information extracted from the actual job that is running on that database instance, the database instance ensures that the job running on the database instance is modified so that it matches the information stored in the master database agent configuration store 250. For example, if the version of the actual job is different from the version of the job specified in the master database agent configuration store 250, the database instance may load the script for the version specified in the master database agent configuration store 250 and start executing that instance, when the job is executed the next time. If the job is currently running, the database instance may shut down the job and restart it using the version stored in the master database agent configuration store 250.

The result analysis module 230 analyzes the results of monitoring database agents and takes actions based on them. In an embodiment, the result analysis module 230 generates reports describing database agents running on servers of a network and provides them for display, for example, to a system administrator of an organization. The result analysis module 230 may generate alerts based on the analysis of information describing database agents. For example, if the result analysis module 230 determines that a database agent is running at a schedule different from the expected schedule stored in the master database agent configuration store, the result analysis module 230 may send an alert to a user, for example, a system administrator. Similarly, if the result analysis module 230 determines that a database agent has a configuration different from the expected configuration stored in the master database agent configuration store, the result analysis module 230 may send an alert to a user, for example, a system administrator.

The user interface module 220 presents a visual representation of the master database agent configuration to a user via a user interface of an application displayed via a client device. The user interface allows the user to interact with the collective master database agent configuration to approve the information or to modify the information if the user determines that the information is not accurate. The user interface module 220 also presents reports and alerts based on the comparison of current database agent information with the collective master database agent configuration.

Overall Process

Figure 3:
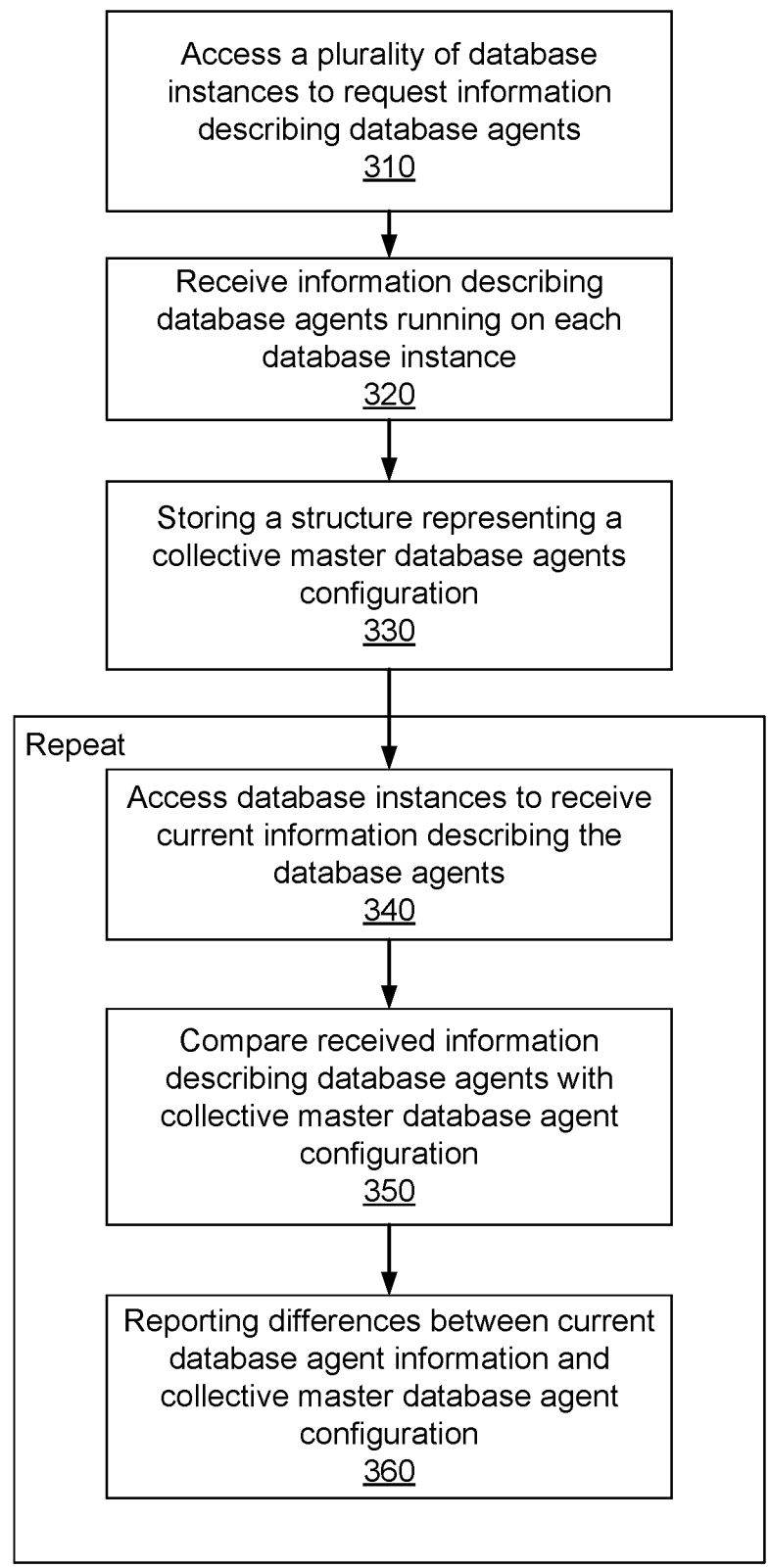
FIG. 3 is a flow chart illustrating the overall process for monitoring database agents running on servers, according to an embodiment.

FIG. 3 is a flow chart 300 illustrating the overall process for monitoring database agents running on a set of servers, according to an embodiment. Other embodiments can perform the steps of these flowcharts in different orders. Other embodiments can include different and/or additional steps than the ones described herein.

The database agent monitoring system 120 accesses 310 database instances running on servers across a network 115. The database agent monitoring system 120 receives 320 from database instance, information describing database agents running on the database instance. The information describing each database agent includes (1) the configuration of the database agent, and (2) a schedule of the database agent. The database agent monitoring system 120 builds and stores 330 a collective master database agent configuration. In an embodiment, the collective master database agent configuration is represented using nested objects. Each nested object describes a database agent executing on a database instance.

The database agent monitoring system 120 repeats the following steps 340, 350, and 360 on a periodic basis, for example, on a daily basis or every few hours. The database agent monitoring system 120 receives current information describing database agents running on each database instance. The information includes the current configuration of the database agent and the current schedule of the database agent. For each database agent running on the database instance, the database agent monitoring system 120 compares the current information describing the database agent with the information describing the database agent in the collective master database agent configuration.

If the database agent monitoring system 120 identifies any difference between the information received from the current database instance and the collective master database agent configuration, the database agent monitoring system 120 sends an alert identifying the database agent. In an embodiment, the database agent monitoring system 120 generates reports describing the database agents and provides for review by a user, for example, a system administrator.

In an embodiment, the database agent monitoring system 120 takes remedial action of there is a discrepancy between the current information describing a database agent and the collective master database agent configuration. For example, for specific database agents, if the database agent monitoring system 120 determines that the database agent is running on a non-standard schedule, the database agent monitoring system 120 sends instructions to modify the schedule of the database agent to remove the discrepancy starting from a specific date or time. The database agent monitoring system 120 also sends an alert to a designated user informing the user of the discrepancy in the schedule of the database agent and the fact that the instructions have been sent for fixing the discrepancy.

Figure 4:
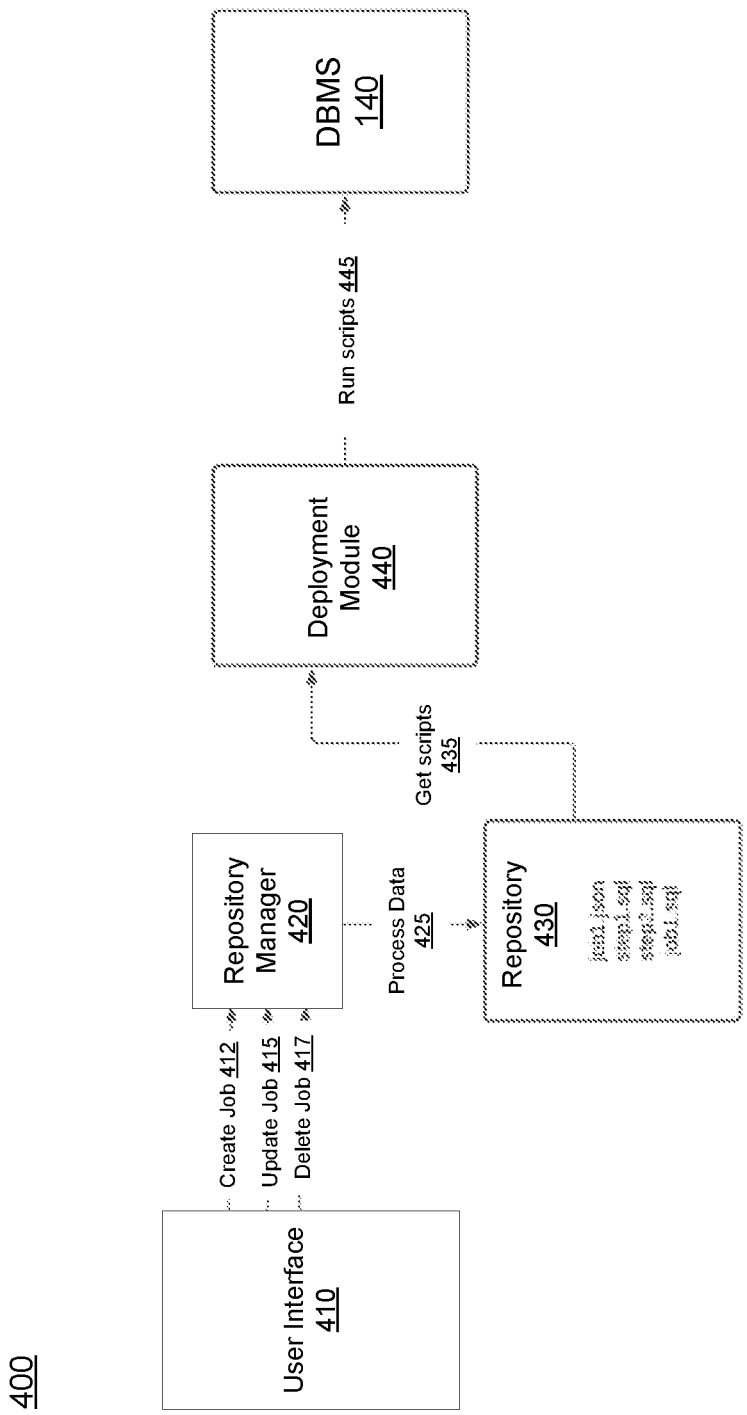
FIG. 4 illustrates the overall process for deploying jobs, according to an embodiment.

FIG. 4 illustrates the overall process 400 for deploying jobs, according to an embodiment. A user interface 410 receives user input that specifies information necessary for performing tasks such as creating 412 jobs, updating 415 a job, deleting 417 a job, and so on. The user input provided by a user via the user interface 410 is received by a repository manager 420 that processes 425 the input data received and stores the information describing the jobs in repository 430. This information includes various configuration files including a JSON job configuration file (or a configuration file using any other syntax), and one or more scripts with instructions for steps of the job. The deployment module 440 receives 435 scripts from the repository and runs 445 the scripts to perform the required operation for a job on the database management system 140.

Figure 5:
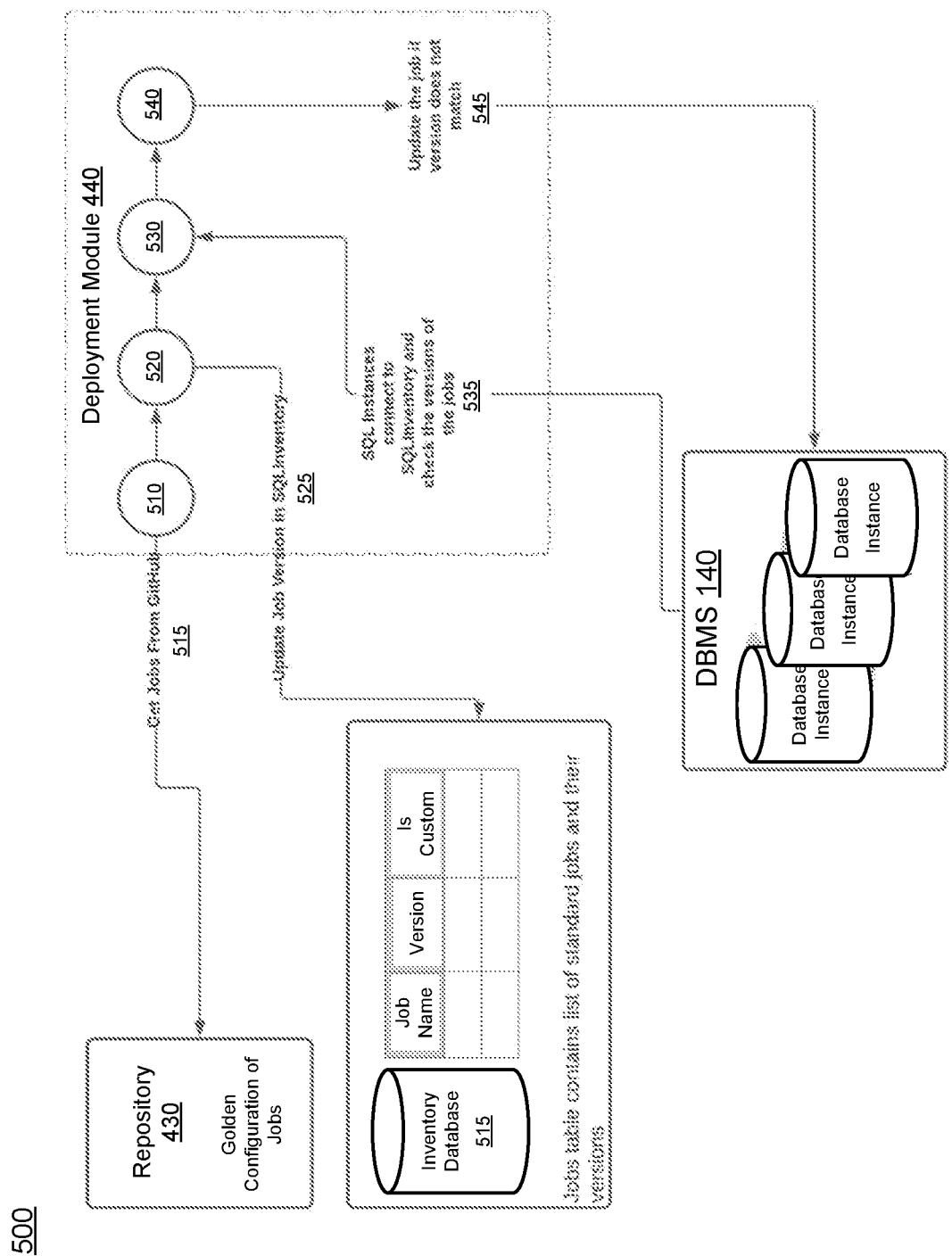
FIG. 5 illustrates the process for deploying jobs, according to another embodiment.

FIG. 5 illustrates the process 500 for deploying jobs, according to another embodiment. The deployment module 440 may execute on any computing system that interacts with the database management system 140. The deployment module 440 executes the deployment process that manages jobs on the database management system. As the first step 510, the deployment module 440 accesses job description and instructions from a repository 430 that stores the master job configurations (or golden configuration of jobs). As the second step 520, the deployment module 440 accesses the inventory database 515 that stores the master database configurations and checks if the job versions stored in the inventory database 515 match the job versions stored in the repository 430. It is possible that users (e.g., database administrators or developers) may have updated the version of the job configuration for a particular job in the repository 430. If the version obtained from the repository 430 is different from the version obtained from the inventory database 515, the deployment module 440 updates the information in the inventory database 515 to match the information of the repository 430 since the information stored in the repository 430 is considered the most authentic information. Accordingly, the inventory database 515 also stores the master configuration of the jobs that is stored in the master database agent configuration store 250.

At step 530, all database management systems 140 (DBMS instances) connect to the inventory database 515 to compare the information of the jobs (database agents) running on the DBMS instance with the information stored in the inventory database. If the information matches, for example, the job executing on the DBMS instance has the same version as the job configuration stored in the inventory database 515, the DBMS instance lets the job continue to execute as scheduled. If the information fails to match, for example, the job executing on the DBMS instance has a different version compared to the version specified in the job configuration stored in the inventory database 515, the DBMS instance updates the job executing to match the job version stored in the inventory database 515. The DBMS instance may execute a job update script that cause the job executing on the DBMS instance to match the job version stored in the inventory database 515.

In an embodiment, the system compares a configuration of a database agent executing in a DBMS instance with the configuration of the database agent stored in the inventory database 515 or the master database agent configuration store 250 by accessing the nested structure representation of the configuration (e.g., the JSON structure), serializing the nested structure, and comparing the serialized structures to determine whether the two structure match.

In an embodiment, the system is a multi-tenant system and the repository 430 may store multiple versions of a database agent configuration if one or more tenants of the multi-tenant system customize the database agents. Accordingly, the database instance determines whether the database instance is used by a specific tenant and checks whether a tenant specific master configuration exists for that database agent. If there is a tenant specific master configuration for that database agent, the system compares the configuration of the database agent running on the database instance with the tenant specific master configuration for the database agent.

Computer Architecture

Figure 6:
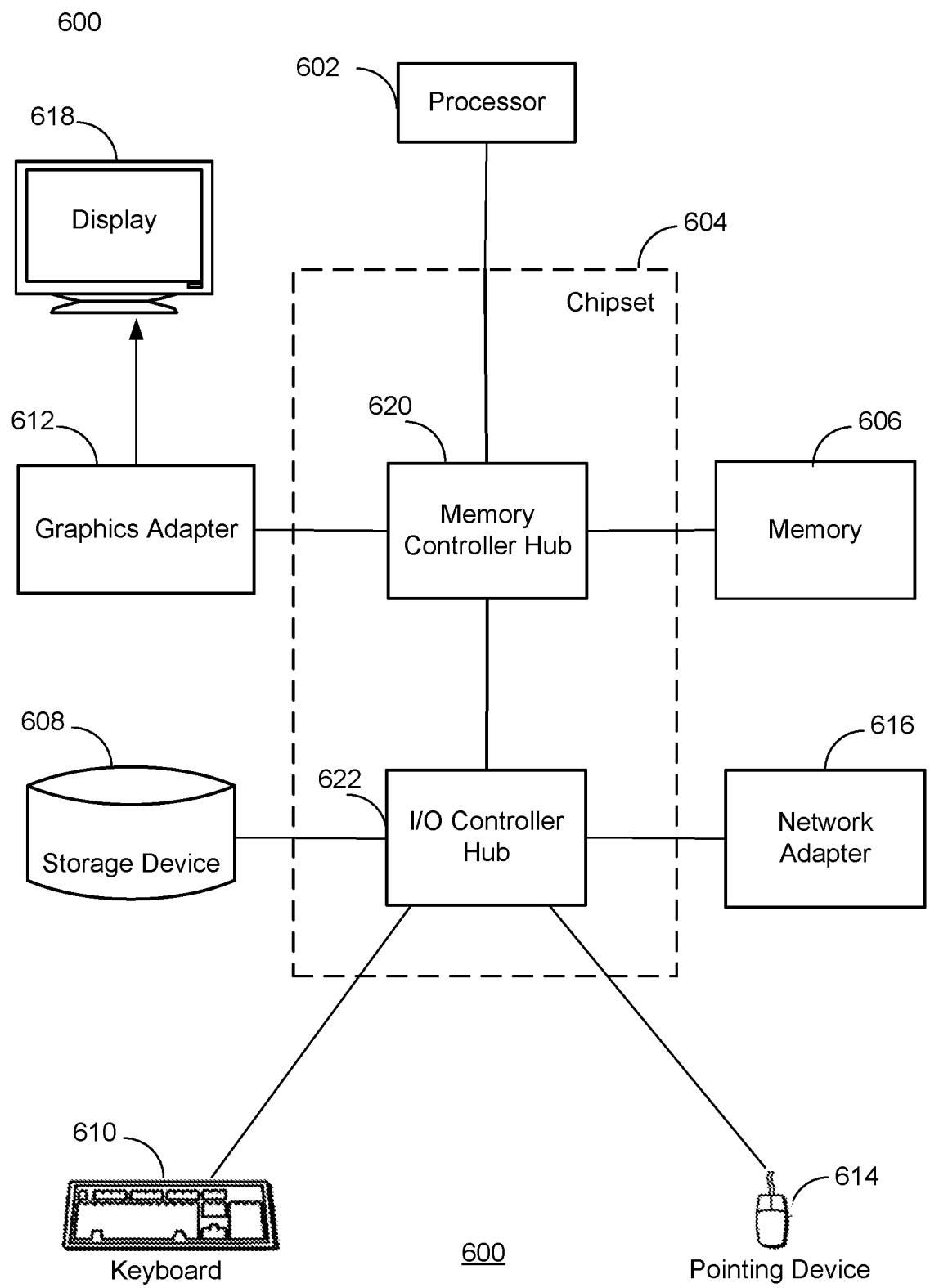
FIG. 6 is a block diagram illustrating a functional view of a typical computer system according to one embodiment.

FIG. 6 is a high-level block diagram illustrating a functional view of a typical computer system for use as one of the entities illustrated in the system environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device may be a mobile phone with limited processing power, a small display 618, and may lack a pointing device 614. A multi-tenant system, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies.

Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for monitoring database agents running on servers connected by a network, the method comprising:
    accessing a plurality of database instances running on a plurality of servers across a network;
    receiving from a database instance, information describing a set of database agents running on the database instance, the information comprising, the configuration of the database agent, and a schedule of the database agent;
    storing a master database agent configuration represented as nested objects, wherein a nested object describing a database agent executing on a database instance; and
    repeating on a periodic basis, for the database instance:
        receiving current information describing database agents running on the database instance;
        comparing the configuration of a database agent running on the database instance with the configuration of the database agent in the master database agent configuration; and
        responsive to identifying a difference between the configuration of the database agent running in the database instance and the configuration of the database agent in the master database agent configuration, sending an alert.

2. The computer-implemented method of claim 1, wherein the nested objects are represented using JSON format.

3. The computer-implemented method of claim 1, wherein the DBMS is an SQL server and each database agent is an SQL agent.

4. The computer-implemented method of claim 1, wherein the database agent represents a process executing a script comprising one or more database commands.

5. The computer-implemented method of claim 1, wherein the configuration of the database agent comprises a version of the script associated with the database agent.

6. The computer-implemented method of claim 1, further comprising:
    configuring a user interface to display the master database agent configuration, wherein the user interface is configured to allow user to modify the master job configuration;
    sending the user interface for display via a client device; and
    receiving one or more modifications to the master database agent configuration.

7. The computer-implemented method of claim 1, further comprising:
    generating a report describing results of aggregating across each of a plurality of database agents, differences between current information describing the database agent with information describing the database agent in the master database agent configuration; and
    sending the generated report for display via a client device.

8. The computer-implemented method of claim 1, further comprising:
    comparing configuration of a database agent executing on a database instance with a configuration of the database agent stored in the master database agent configuration; and
    responsive to determining that the configuration of the database agent executing on the database instance fails to match the configuration of the database agent stored in the master database agent configuration, executing instructions on the database instance to update the database agent executing on the database instance to match the configuration stored in the master database agent configuration.

9. The computer-implemented method of claim 8, wherein comparing configuration of a database agent executing on a database instance with a configuration of the database agent stored in the master database agent configuration comprises comparing a version identifier of the database agent executing on a database instance with a version identifier of the database agent stored in the master database agent configuration.

10. The computer-implemented method of claim 8, wherein comparing configuration of a database agent executing on a database instance with a configuration of the database agent stored in the master database agent configuration comprises:
    accessing a first nested structure representing configuration of the database agent executing on the database instance;
    accessing a second nested structure representing configuration of the database agent stored in the master database agent configuration; and
    comparing the first nested structure with the second nested structure to determine whether the two match.

11. A non-transitory computer readable storage medium storing instructions that when executed by the computer processor cause the computer processor to execute instructions of a method for monitoring database agents running on servers connected by a network, the steps comprising:
    accessing a plurality of database instances running on a plurality of servers across a network;
    receiving from a database instance, information describing a set of database agents running on the database instance, the information comprising, the configuration of the database agent, and a schedule of the database agent;
    storing a master database agent configuration represented as nested objects, wherein a nested object describing a database agent executing on a database instance; and
    repeating on a periodic basis, for the database instance:
        receiving current information describing database agents running on the database instance;
        comparing the configuration of a database agent running on the database instance with the configuration of the database agent in the master database agent configuration; and
        responsive to identifying a difference between the configuration of the database agent running in the database instance and the configuration of the database agent in the master database agent configuration, sending an alert.

12. The non-transitory computer readable storage medium of claim 11, further comprising:

configuring a user interface to display the master database agent configuration, wherein the user interface is configured to allow user to modify the master job configuration;

sending the user interface for display via a client device; and receiving one or more modifications to the master database agent configuration.

13. The non-transitory computer readable storage medium of claim 11, further comprising:

generating a report describing results of aggregating across each of a plurality of database agents, differences between current information describing the database agent with information describing the database agent in the master database agent configuration; and sending the generated report for display via a client device.

14. The non-transitory computer readable storage medium of claim 11, further comprising:

comparing configuration of a database agent executing on a database instance with a configuration of the database agent stored in the master database agent configuration; and responsive to determining that the configuration of the database agent executing on the database instance fails to match the configuration of the database agent stored in the master database agent configuration, executing instructions on the database instance to update the database agent executing on the database instance to match the configuration stored in the master database agent configuration.

15. The non-transitory computer readable storage medium of claim 14, wherein comparing configuration of a database agent executing on a database instance with a configuration of the database agent stored in the master database agent configuration comprises:

accessing a first nested structure representing configuration of the database agent executing on the database instance;

accessing a second nested structure representing configuration of the database agent stored in the master database agent configuration; and comparing the first nested structure with the second nested structure to determine whether the two match.

16. A computer system comprising:

a computer processor; and a non-transitory computer readable storage medium storing instructions that when executed by the computer processor cause the computer processor to execute instructions of a method for monitoring database agents running on servers connected by a network, the steps comprising:

accessing a plurality of database instances running on a plurality of servers across a network;

receiving from a database instance, information describing a set of database agents running on the database instance, the information comprising, the configuration of the database agent, and a schedule of the database agent;

storing a master database agent configuration represented as nested objects, wherein a nested object describing a database agent executing on a database instance; and repeating on a periodic basis, for the database instance:

receiving current information describing database agents running on the database instance;

comparing the configuration of a database agent running on the database instance with the configuration of the database agent in the master database agent configuration; and responsive to identifying a difference between the configuration of the database agent running in the database instance and the configuration of the database agent in the master database agent configuration, sending an alert.

17. The computer system of claim 16, further comprising:

configuring a user interface to display the master database agent configuration, wherein the user interface is configured to allow user to modify the master job configuration;

sending the user interface for display via a client device; and receiving one or more modifications to the master database agent configuration.

18. The computer system of claim 16, further comprising:

generating a report describing results of aggregating across each of a plurality of database agents, differences between current information describing the database agent with information describing the database agent in the master database agent configuration; and sending the generated report for display via a client device.

19. The computer system of claim 16, further comprising:

comparing configuration of a database agent executing on a database instance with a configuration of the database agent stored in the master database agent configuration; and responsive to determining that the configuration of the database agent executing on the database instance fails to match the configuration of the database agent stored in the master database agent configuration, executing instructions on the database instance to update the database agent executing on the database instance to match the configuration stored in the master database agent configuration.

20. The computer system of claim 19, wherein comparing configuration of a database agent executing on a database instance with a configuration of the database agent stored in the master database agent configuration comprises:

accessing a first nested structure representing configuration of the database agent executing on the database instance;

accessing a second nested structure representing configuration of the database agent stored in the master database agent configuration; and comparing the first nested structure with the second nested structure to determine whether the two match.

* * * * *